(12) United States Patent
Hiskett

(10) Patent No.: US 7,523,056 B2
(45) Date of Patent: Apr. 21, 2009

(54) EVALUATION OF SECURITIES

(76) Inventor: Herbert Charles Hiskett, 121 Panorama Drive, Constantia Kloof 1709, Gauteng (ZA)

( * ) Notice: Subject to any disclaimer, the term of this patent is extended or adjusted under 35 U.S.C. 154(b) by 636 days.

(21) Appl. No.: 11/102,904

(22) Filed: Apr. 8, 2005

(65) Prior Publication Data

US 2006/0229962 A1  Oct. 12, 2006

(51) Int. Cl.
*G06Q 40/00* (2006.01)
(52) U.S. Cl. .......................................... 705/35; 705/36
(58) Field of Classification Search .............. 705/10–44
See application file for complete search history.

(56) References Cited

U.S. PATENT DOCUMENTS

| 5,761,442 | A | * | 6/1998 | Barr et al. ................. 705/36 R |
| 5,946,666 | A | * | 8/1999 | Nevo et al. ................ 705/36 R |
| 5,978,778 | A | * | 11/1999 | O'Shaughnessy ......... 705/36 R |
| 6,018,722 | A | * | 1/2000 | Ray et al. ................. 705/36 R |
| 6,317,726 | B1 | * | 11/2001 | O'Shaughnessy ......... 705/36 R |
| 6,510,419 | B1 | * | 1/2003 | Gatto ....................... 705/36 R |
| 6,681,211 | B1 | * | 1/2004 | Gatto ....................... 705/36 R |
| 7,149,716 | B2 | * | 12/2006 | Gatto ....................... 705/36 R |

FOREIGN PATENT DOCUMENTS

ZA        2001/4855        4/2003

OTHER PUBLICATIONS

Poyner, J., "Micron Electronics-Company Report", Oppenheimer & Co., Inc., Mar. 13, 1997, Dialog file 545, Accession No. 06926059.*
"Do investor sophistication and trading experience eliminate behavioral biases in finanacial markets", European Finance Review, v 9, n 3, p. 305, Sep. 2005, Dialog file 9, Accession 04080175.*

* cited by examiner

*Primary Examiner*—Frantzy Poinvil
(74) *Attorney, Agent, or Firm*—Christie, Parker & Hale, LLP

(57) ABSTRACT

A method for evaluating securities comprises the steps of estimating a P/E ratio for a security that will yield a predetermined rate of return on an investment in said security, inputting an actual historical P/E ratio for the security, determining a merit rating for the security as a function of the estimated P/E ratio and of the historical P/E ratio of the security; and displaying the merit rating in a perceptible form.

21 Claims, 19 Drawing Sheets

| Column A | B Price | | Last Report | D | C HEPS Rpt | PE Nom | Year Frac | HEPS Now | D PE Now | E G % | F Fade Ratio 9 | G Count n | H Fair PE | I Merit O/J | Shares No Value | War No |
|---|---|---|---|---|---|---|---|---|---|---|---|---|---|---|---|---|
| JSE/Ov | 9263 | | | | | | | | | | | | | | | |
| J | PSG | 667 | 2/28/01 | F | 150.3 | 4.4 | 0.26 | 153.5 | 4.3 | 8 | 1.52 | 31.0 | 3.9 | 0.91 | | |
| G | Corpgro | 225 | 2/28/01 | – | 58.0 | 3.9 | 0.26 | 58.2 | 3.9 | 1 | 1.67 | 26.0 | 3.4 | 0.87 | | |
| BQ | Sasfin | 655 | 12/30/00 | F | 161.4 | 4.1 | 0.43 | 161.9 | 4.0 | 1 | 1.52 | 25.0 | 3.3 | 0.82 | | |
| BI | Saambou | 1270 | 3/30/01 | F | 140.1 | 9.1 | 0.18 | 146.4 | 8.7 | 25 | 1.22 | 42.2 | 7.0 | 0.81 | | |
| BN | Adcorp | 1305 | 12/30/00 | F | 192.0 | 6.8 | 0.43 | 208.4 | 6.3 | 20 | 1.43 | 34.4 | 4.8 | 0.77 | | |
| T | Aplitec | 290 | 12/30/00 | – | 41.7 | 7.0 | 0.43 | 45.6 | 6.4 | 22 | 1.43 | 34.7 | 4.8 | 0.76 | | |
| DA | Old Mut | 1755 | 12/30/00 | – | 179.4 | 9.8 | 0.43 | 192.4 | 9.1 | 17 | 1.14 | 48.2 | 6.7 | 0.74 | | |
| Q | Grintek | 194 | 12/30/00 | – | 39.3 | 4.9 | 0.43 | 39.8 | 4.9 | 3 | 1.56 | 28.5 | 3.5 | 0.71 | | |
| B | Netcare | 160 | 3/30/01 | – | 23.2 | 6.9 | 0.18 | 24.0 | 6.7 | 20 | 1.52 | 33.2 | 4.8 | 0.71 | | |
| AW | Rebhld | 800 | 12/30/00 | F | 148.4 | 5.4 | 0.43 | 151.6 | 5.3 | 5 | 1.47 | 30.2 | 3.7 | 0.70 | | |
| BC | Softline | 137 | 3/30/01 | F | 28.3 | 4.8 | 0.18 | 28.4 | 4.8 | 1 | 2.00 | 26.0 | 3.4 | 0.70 | | |
| H | Mustek | 165 | 12/30/00 | – | 34.0 | 4.9 | 0.43 | 34.1 | 4.8 | 1 | 2.50 | 26.0 | 3.4 | 0.70 | | |
| CD | Nedcor | 14760 | 12/30/00 | F | 1267.0 | 11.6 | 0.43 | 1385.8 | 10.7 | 22 | 1.18 | 45.0 | 7.3 | 0.69 | | |
| D | Laser | 235 | 9/30/00 | – | 40.0 | 5.9 | 0.67 | 42.7 | 5.5 | 10 | 1.85 | 29.7 | 3.7 | 0.67 | | |
| BT | ABSA | 3450 | 3/30/01 | F | 378.7 | 9.1 | 0.18 | 391.0 | 8.8 | 18 | 1.18 | 43.8 | 5.9 | 0.67 | | |
| XC | Datatec | 2070 | 3/30/01 | F | 376.2 | 5.5 | 0.18 | 383.0 | 5.4 | 10 | 2.22 | 28.9 | 3.6 | 0.66 | | |
| AD | Bowcalf | 150 | 12/30/00 | F | 18.3 | 8.2 | 0.43 | 19.9 | 7.5 | 20 | 1.43 | 34.4 | 4.8 | 0.64 | | |
| BL | Af Harv | 270 | 3/30/01 | – | 48.4 | 5.6 | 0.18 | 48.6 | 5.6 | 3 | 1.25 | 30.9 | 3.6 | 0.64 | | |
| BP | Captall | 960 | 9/30/00 | – | 134.1 | 7.2 | 0.67 | 145.0 | 6.6 | 12 | 1.39 | 33.6 | 4.2 | 0.64 | | |
| CY | Northam | 1650 | 12/30/00 | F | 245.9 | 6.7 | 0.43 | 261.6 | 6.3 | 15 | 1.85 | 30.4 | 4.0 | 0.64 | | |
| BW | AlexFb | 1800 | 3/30/01 | F | 118.3 | 15.2 | 0.18 | 123.6 | 14.6 | 25 | 1.14 | 51.2 | 9.3 | 0.64 | | |
| BY | Chemsv | 1395 | 12/30/00 | F | 149.2 | 9.3 | 0.43 | 163.2 | 8.5 | 22 | 1.35 | 36.3 | 5.4 | 0.63 | | |
| M | Servest | 98 | 2/28/01 | F | 14.1 | 7.0 | 0.26 | 14.8 | 6.6 | 18 | 1.67 | 31.7 | 4.2 | 0.63 | | |
| AB | Altech | 2300 | 2/28/01 | F | 223.1 | 10.3 | 0.26 | 242.4 | 9.5 | 33 | 1.39 | 36.6 | 6.0 | 0.63 | | |
| DC | MGX | 960 | 12/30/00 | F | 160.9 | 6.0 | 0.43 | 167.8 | 5.7 | 10 | 2.22 | 28.9 | 3.6 | 0.63 | | |
| AI | Nuwrld | 1005 | 2/28/01 | F | 147.2 | 6.8 | 0.26 | 153.4 | 6.6 | 16 | 1.61 | 31.8 | 4.1 | 0.63 | | |
| Y | Sasol | 7770 | 12/30/00 | – | 1035.0 | 7.5 | 0.43 | 1149.7 | 6.8 | 26 | 2.00 | 30.7 | 4.2 | 0.62 | | |
| CW | Tngaat | 4130 | 12/30/00 | F | 507.9 | 8.1 | 0.43 | 538.2 | 7.7 | 14 | 1.28 | 36.6 | 4.7 | 0.61 | | |
| BJ | Brait | 1230 | 3/30/01 | F | 200.0 | 6.2 | 0.18 | 201.8 | 6.1 | 5 | 1.47 | 30.2 | 3.7 | 0.61 | | |
| AY | Sanlam | 990 | 12/30/00 | F | 90.6 | 10.9 | 0.43 | 96.7 | 10.2 | 16 | 1.14 | 47.7 | 6.2 | 0.61 | | |

FIG. 2

|  | Price | Note | Last Report | Dividend Date | Divi | HEPS | PE Nom | Year Frac |
|---|---:|---|---|---|---:|---:|---:|---:|
| INDEX | 11742 | | | | | | | |
| Sasfin | 1500 | | Jun-04 | 6 | 5-Nov 94.0 | 232.5 | 6.5 | 0.6 |
| Pinncle | 44 | | Jun-04 | 12 | 12-Nov 1.5 | 8.9 | 4.9 | 0.6 |
| Argent | 680 | | Mar-04 | 12 | | 106.2 | 6.4 | 0.9 |
| SAEagle | 11250 | | Jun-04 | 6 | | 1867 | 6.0 | 0.6 |
| SvFood | 455 | | Aug-04 | 12 | 19-Nov 5.0 | 74.2 | 6.1 | 0.4 |
| Santam | 5851 | | Jun-04 | 6 | | 949 | 6.2 | 0.6 |
| Telkom | 8200 | | Mar-04 | 12 | | 863 | 9.5 | 0.9 |
| Stanbic | 5060 | | Jun-04 | 6 | | 489.4 | 10.3 | 0.6 |
| Sabvest | 220 | | Jun-04 | 6 | | 51.5 | 4.3 | 0.6 |
| AFGRI | 690 | | Feb-04 | 12 | | 92.5 | 7.5 | 0.9 |
| Barwrld | 8205 | | Mar-04 | 6 | | 739.0 | 11.1 | 0.9 |
| ABSA | 6500 | | Mar-04 | 12 | | 638.0 | 10.2 | 0.9 |
| Group 5 | 1220 | | Jun-04 | 12 | 15-Oct 29.0 | 134.2 | 9.1 | 0.6 |
| Nuworld | 2700 | | Feb-04 | 6 | | 231.7 | 11.7 | 0.9 |
| Connect | 800 | | Aug-04 | 12 | | 87.4 | 9.1 | 0.4 |
| Hiveld | 3320 | | Jun-04 | 6 | | 395.1 | 8.4 | 0.6 |
| Enserv | 345 | | Jun-04 | 12 | 8-Oct 13.0 | 40.7 | 8.5 | 0.6 |
| JDGroup | 5225 | | Feb-04 | 6 | | 434.6 | 12.0 | 0.9 |
| FstRand | 1190 | | Jun-04 | 12 | 15-Oct 26.8 | 107.7 | 11.0 | 0.6 |
| Astrapk | 875 | | Aug-04 | 6 | | 94.0 | 9.3 | 0.4 |
| Cadiz | 235 | | Jun-04 | 6 | | 31.5 | 7.5 | 0.6 |
| Ellerine | 4325 | | Feb-04 | 6 | | 387.6 | 11.2 | 0.9 |
| Brandcorp | 635 | | Jun-04 | 12 | | 75.8 | 8.4 | 0.6 |
| Netcare | 565 | | Sep-04 | 12 | | 55.0 | 10.3 | 0.3 |
| Digicor | 106 | | Jun-04 | 12 | 15-Oct 3.0 | 11.9 | 8.9 | 0.6 |
| Medclin | 1435 | | Mar-04 | 12 | | 129.5 | 11.1 | 0.9 |
| Abil | 1400 | | Mar-04 | 6 | | 139.0 | 10.1 | 0.9 |
| Omnia | 3600 | | Mar-04 | 12 | | 402.3 | 8.9 | 0.9 |
| Grindrd | 3015 | | Jun-04 | 6 | | 384.6 | 7.8 | 0.6 |
| Truwrths | 1260 | | Jun-04 | 12 | | 107.4 | 11.7 | 0.6 |
| Altron | 1330 | | Aug-04 | 6 | | 144.0 | 9.2 | 0.4 |
| Mr Price | 870 | | Mar-04 | 12 | | 80.5 | 10.8 | 0.9 |
| Libhold | 15000 | | Jun-04 | 6 | | 1374 | 10.9 | 0.6 |
| Metair | 17550 | | Jun-03 | 6 | | 2278 | 7.7 | 1.6 |
| Nuclicks | 759 | | Feb-04 | 6 | | 72.7 | 10.4 | 0.9 |
| Bowcalf | 500 | | Jun-04 | 12 | | 44.8 | 11.2 | 0.6 |
| EntpsOut | 378 | | Jul-04 | 12 | 22-Oct 10.0 | 39.0 | 9.7 | 0.5 |
| Hudaco | 2900 | | May-04 | 6 | | 368 | 7.9 | 0.7 |
| Edcon | 19600 | | Mar-04 | 12 | | 1367 | 14.3 | 0.9 |
| Iliad | 800 | | Jun-04 | 12 | | 80.5 | 9.9 | 0.6 |
| Sanlam | 1065 | | Jun-04 | 6 | | 103.3 | 10.3 | 0.6 |
| Nampak | 1405 | | Mar-04 | 6 | | 150.2 | 9.4 | 0.9 |
| Massmart | 4030 | | Jun-04 | 12 | | 307.5 | 13.1 | 0.6 |
| Imperi | 8550 | | Jun-04 | 12 | | 789.2 | 10.8 | 0.6 |
| Seardel | 330 | | Jun-03 | 12 | 12-Nov 14.0 | 55.0 | 6.0 | 1.6 |
| Woolies | 880 | | Jun-04 | 12 | | 76.5 | 11.5 | 0.6 |
| Bdvest | 6400 | | Jun-04 | 6 | | 546.7 | 11.7 | 0.6 |

FIG. 5A

| Growth % Curr | % G | Star Rating *** | Attenuation % | g | n | Fair PE | Merit Q/L | |
|---|---|---|---|---|---|---|---|---|
| 12 | 12 | 3 | 6.5 | 1.07 | 101 | 6.5 | 1.09 | SFN |
| 5 | 5 | 2 | 2.8 | 1.03 | 139 | 4.8 | 1.00 | PNC |
| 10 | 10 | 2 | 6.2 | 1.07 | 99 | 5.9 | 1.00 | ART |
| -5 | 8 | 2 | 4.8 | 1.05 | 111 | 5.5 | 0.89 | SAE |
| 0 | 8 | 2 | 4.8 | 1.05 | 111 | 5.5 | 0.90 | SOV |
| -11 | 8 | 2 | 4.8 | 1.05 | 111 | 5.5 | 0.83 | SNT |
| 46 | 20 | 1 | 15.0 | 1.18 | 64 | 6.5 | 0.95 | TLK |
| 15 | 14 | 5 | 5.2 | 1.05 | 126 | 8.0 | 0.85 | SBC |
| 0 | 1 | 1 | 0.5 | 1.00 | 27 | 3.4 | 0.79 | SBV |
| 8 | 8 | 2 | 4.8 | 1.05 | 111 | 5.5 | 0.79 | AFR |
| 21 | 17 | 4 | 7.9 | 1.09 | 95 | 7.7 | 0.82 | BAW |
| 12 | 12 | 5 | 4.4 | 1.05 | 137 | 7.4 | 0.80 | ASA |
| 16 | 16 | 2 | 10.4 | 1.12 | 78 | 6.7 | 0.81 | GRF |
| 46 | 16 | 3 | 8.9 | 1.10 | 86 | 6.9 | 0.85 | NWL |
| 16 | 16 | 2.5 | 9.6 | 1.11 | 82 | 6.9 | 0.80 | CCT |
| 140 | 4 | 2 | 2.2 | 1.02 | 153 | 4.5 | 0.99 | HVL |
| 11 | 11 | 3 | 5.9 | 1.06 | 105 | 6.2 | 0.79 | ENV |
| 39 | 19 | 3 | 10.7 | 1.12 | 79 | 7.3 | 0.83 | JDG |
| 14 | 14 | 5 | 5.2 | 1.05 | 126 | 8.0 | 0.79 | FSR |
| 18 | 14 | 3 | 7.7 | 1.08 | 93 | 6.9 | 0.79 | APK |
| 3 | 9 | 1 | 6.3 | 1.07 | 95 | 5.5 | 0.76 | CDZ |
| 35 | 14 | 3 | 7.7 | 1.08 | 93 | 6.9 | 0.81 | ELH |
| 15 | 11 | 2 | 6.9 | 1.07 | 94 | 6.0 | 0.78 | BRC |
| 20 | 20 | 3 | 11.3 | 1.13 | 77 | 7.4 | 0.77 | NTC |
| 32 | 12 | 1 | 8.7 | 1.09 | 82 | 5.9 | 0.79 | DGC |
| 19 | 14 | 4 | 6.5 | 1.07 | 106 | 7.3 | 0.76 | MDC |
| 11 | 14 | 3 | 7.7 | 1.08 | 93 | 6.9 | 0.74 | ABIL |
| 30 | 8 | 2 | 4.8 | 1.05 | 111 | 5.5 | 0.77 | OMN |
| 53 | 5 | 2 | 2.8 | 1.03 | 139 | 4.8 | 0.81 | GND |
| 25 | 16 | 4 | 7.3 | 1.08 | 100 | 7.6 | 0.75 | TRU |
| 10 | 10 | 4 | 4.5 | 1.05 | 127 | 6.3 | 0.72 | ATN |
| 18 | 15 | 3 | 8.3 | 1.09 | 89 | 6.8 | 0.73 | MPC |
| 8 | 12 | 5 | 4.4 | 1.05 | 137 | 7.4 | 0.71 | LBH |
| 0 | 8 | 1 | 5.5 | 1.06 | 100 | 5.3 | 0.69 | MTA |
| 6 | 16 | 3 | 8.9 | 1.10 | 86 | 6.9 | 0.70 | NCL |
| 22 | 22 | 2 | 14.5 | 1.17 | 67 | 7.2 | 0.73 | BCF |
| 15 | 15 | 2 | 9.7 | 1.11 | 80 | 6.5 | 0.72 | EOH |
| 5 | 7 | 2 | 4.2 | 1.04 | 119 | 5.3 | 0.70 | HDC |
| 47 | 16 | 4 | 7.5 | 1.08 | 99 | 7.8 | 0.76 | ECO |
| 21 | 12 | 2.5 | 7.1 | 1.08 | 95 | 6.3 | 0.72 | ILA |
| 10 | 10 | 5 | 3.6 | 1.04 | 152 | 6.8 | 0.70 | SLM |
| 5 | 10 | 3 | 5.3 | 1.06 | 111 | 6.1 | 0.68 | NPK |
| 27 | 18 | 4 | 8.6 | 1.09 | 92 | 8.1 | 0.72 | MSM |
| 17 | 14 | 3 | 7.7 | 1.08 | 93 | 6.9 | 0.70 | IPL |
| 1 | 2 | 0 | 1.2 | 1.01 | 142 | 3.9 | 0.66 | SER |
| 15 | 14 | 4 | 6.5 | 1.07 | 106 | 7.3 | 0.69 | WHL |
| 21 | 14 | 4 | 6.5 | 1.07 | 106 | 7.3 | 0.70 | BVT |

FIG. 5B

| INDEX | Price | Note | Last Report | Dividend Date | Divi | HEPS | PE Nom | |
|---|---|---|---|---|---|---|---|---|
| Advtech | 99 | | Jun-04 | 6 | | 9.8 | 10.1 | 0.6 |
| Iscor | 4965 | | Jun-04 | 6 | | 449.0 | 11.1 | 0.6 |
| Foschini | 2730 | | Sep-04 | 6 | | 250.3 | 10.9 | 0.3 |
| Steinhof | 1020 | | Jun-04 | 12 | | 109.0 | 9.4 | 0.6 |
| AlxFbes | 1190 | | Mar-04 | 12 | | 131.0 | 9.1 | 0.9 |

FIG. 5C

| Growth % Curr | G | Star Rating *** | Attenuation % | g | n | Fair PE | Merit O/L | |
|---|---|---|---|---|---|---|---|---|
| 28 | 12 | 2 | 7.6 | 1.08 | 90 | 6.2 | 0.71 | ADH |
| 96 | 8 | 3 | 4.2 | 1.04 | 125 | 5.7 | 0.81 | ISC |
| 35 | 13 | 4 | 6.0 | 1.06 | 110 | 7.0 | 0.72 | FOS |
| 10 | 10 | 2 | 6.2 | 1.07 | 99 | 5.9 | 0.67 | SHF |
| 5 | 8 | 3 | 4.2 | 1.04 | 125 | 5.7 | 0.65 | AFB |

FIG. 5D

|  | Initial Portfolio | | | | |
|---|---|---|---|---|---|
|  | 5-Apr-02 | | | 30-Apr-02 | |
|  | Shares | Price | Invest | Price | Value |
|  | Crpcap | 150 | 10000 | 132 | 8800 |
|  | Enserv | 120 | 10000 | 150 | 12500 |
|  | AST | 110 | 10000 | 56 | 5091 |
|  | Mustak | 265 | 10000 | 410 | 15472 |
|  | Group5 | 345 | 10000 | 525 | 15217 |
|  | AFGRI | 519 | 10000 | 525 | 10116 |
|  | MGX | 870 | 10000 | 560 | 6437 |
|  | BOE | 309 | 10000 | 360 | 11650 |
|  | Spur | 265 | 10000 | 295 | 11132 |
|  | ELB | 900 | 10000 | 960 | 10667 |
|  | TOTAL | | 100000 | | 107081 |
|  | Gain % | | | | 7.1 |
|  | JSE | | 11255 | | 9677 |
|  | Gain % | | | | -14.0 |
|  | Difference | | | | 21.1 |

| Sales | New Portfolio, 1 | | | | |
|---|---|---|---|---|---|
|  | 30-Aug-02 | | | 26-Nov-02 | |
|  | Shares | Price | Value | Price | Value |
| 8360 | AlxFbs | 1380 | 9072 | 1360 | 8940 |
| 11875 | Pepkor | 480 | 9072 | 585 | 11537 |
| 4836 | Grintek | 188 | 9072 | 180 | 9837 |
|  | Bell | 835 | 9072 | 950 | 10321 |
|  | ELB | 360 | 9072 | 324 | 8164 |
| 9610 | Connct | 210 | 9072 | 216 | 9331 |
| 6115 | Group5 | 525 | 15217 | 686 | 19884 |
| 11068 | Cashbil | 650 | 9072 | 900 | 12561 |
| 10575 | Mustek | 410 | 15472 | 540 | 20378 |
| 10134 | Nuwrld | 1050 | 9072 | 1115 | 9633 |
| 72573 |  |  |  |  | 120585 |
|  |  |  |  |  | 20.6 |
|  |  |  |  | 9239 |  |
|  |  |  |  |  | -17.9 |
|  |  |  |  |  | 38.5 |

FIG. 6A

|  | New Portfolio, 2 | | | | |
|---|---|---|---|---|---|
| Sales | 26-Nov-02 | | | 7-Feb-03 | |
|  | Shares | Price | Value | Price | Value |
| 8493 | Grindrd | 690 | 9272 | 651 | 8748 |
| 10960 | Massmt | 1750 | 9272 | 1905 | 10093 |
| 9345 | Kumba | 3466 | 9272 | 3400 | 9095 |
| 9805 | Altech | 2500 | 9272 | 2225 | 8252 |
| 7756 | Netcare | 304 | 9272 | 300 | 9150 |
|  | Connct | 216 | 9331 | 202 | 8726 |
|  | Group5 | 686 | 19884 | 737 | 21362 |
|  | Cashbil | 900 | 12561 | 920 | 12840 |
|  | Mustek | 540 | 20378 | 480 | 18114 |
|  | Nuwrld | 1115 | 9633 | 1120 | 9676 |
| 46359 |  |  |  |  | 116055 |
|  |  |  |  |  | 16.1 |
|  |  |  |  | 8806 |  |
|  |  |  |  |  | -21.8 |
|  |  |  |  |  | 37.8 |

|  | New Portfolio, 3 | | | | |
|---|---|---|---|---|---|
| Sales | 7-Feb-03 | | | 12-Mar-03 | |
|  | Shares | Price | Value | Price | Value |
| 8310 | Stanbic | 3000 | 8707 | 2770 | 8040 |
| 9588 | Astrapak | 395 | 8707 | 400 | 8817 |
| 8640 | Iliad | 280 | 8707 | 280 | 8707 |
|  | Altech | 2225 | 8251 | 2000 | 7417 |
|  | Netcare | 300 | 9150 | 295 | 8997 |
| 8290 | Reunert | 1820 | 8707 | 1750 | 8372 |
|  | Group5 | 737 | 21362 | 585 | 16956 |
|  | Cashbil | 920 | 12840 | 1250 | 17445 |
|  | Mustek | 480 | 18114 | 448 | 16908 |
|  | Nuwrld | 1120 | 9677 | 1000 | 8640 |
| 34828 |  |  |  |  | 110298 |
|  |  |  |  |  | 10.3 |
|  |  |  |  | 8279 |  |
|  |  |  |  |  | -26.4 |
|  |  |  |  |  | 36.7 |

FIG. 6B

|  | New Portfolio, 4 | | | | |
|---|---|---|---|---|---|
| Sales | 12-Mar-03 | | | 16-May-03 | |
|  | Shares | Price | Value | Price | Value |
| 7638 | Hudaco | 1680 | 12068 | 1640 | 11781 |
|  | Astrapak | 400 | 8817 | 405 | 8927 |
|  | Iliad | 280 | 8707 | 280 | 8707 |
|  | Altech | 2000 | 7417 | 2225 | 8251 |
|  | Netcare | 295 | 8997 | 310 | 9454 |
| 7954 | Grindrod | 600 | 12068 | 595 | 11968 |
| 16108 | Mr Price | 460 | 12068 | 500 | 13118 |
| 16573 | Af Health | 775 | 12068 | 910 | 14170 |
|  | Mustek | 448 | 16908 | 448 | 16906 |
|  | Nuwrld | 1000 | 8640 | 995 | 8597 |
| 48273 |  |  |  |  | 111880 |
|  |  |  |  |  | 11.9 |
|  |  |  |  | 8159 |  |
|  |  |  |  |  | -27.5 |
|  |  |  |  |  | 39.4 |

|  | New Portfolio, 5 | | | | |
|---|---|---|---|---|---|
| Sales | 16-May-03 | | | 4-Aug-03 | |
|  | Shares | Price | Value | Price | Value |
|  | Hudaco | 1640 | 11781 | 1900 | 13649 |
|  | Astrapak | 405 | 8927 | 475 | 10470 |
|  | Iliad | 280 | 8707 | 315 | 9795 |
|  | Altech | 2225 | 8251 | 2615 | 9598 |
|  | Netcare | 310 | 9454 | 382 | 11650 |
| 11389 | Cashbil | 1280 | 11369 | 1700 | 15099 |
|  | Mr Price | 500 | 13118 | 630 | 16528 |
|  | Af Health | 910 | 14170 | 1145 | 17830 |
|  | Mustek | 448 | 15906 | 511 | 19283 |
|  | Nuwrld | 995 | 8597 | 1225 | 10584 |
| 11389 |  |  |  |  | 134587 |
|  |  |  |  |  | 34.6 |
|  |  |  |  | 8807 |  |
|  |  |  |  |  | -21.8 |
|  |  |  |  |  | 56.3 |

FIG. 6C

| Sales | New Portfolio, 6 | | | | |
|---|---|---|---|---|---|
| | 4-Aug-03 | | | 14-Aug-03 | |
| | Shares | Price | Value | Price | Value |
| 12966 | Mediclin | 930 | 11576 | 970 | 12074 |
| 9947 | Stanblc | 3410 | 11577 | 3345 | 11356 |
| | Iliad | 315 | 9795 | 400 | 12438 |
| 9213 | ABSA | 3600 | 11576 | 3670 | 11801 |
| | Netcare | 382 | 11651 | 383 | 11682 |
| | Cashbil | 1700 | 15099 | 1845 | 16387 |
| 15702 | AFGRI | 485 | 11577 | 485 | 11577 |
| | Af Health | 1145 | 17830 | 1306 | 20337 |
| | Mustek | 511 | 19283 | 550 | 20755 |
| 10054 | Omnia | 1940 | 11576 | 1939 | 11570 |
| 57882 | | | | | 139977 |
| | | | | | 40.0 |
| | | | | 8991 | |
| | | | | | -20.1 |
| | | | | | 60.1 |

| Sales | New Portfolio, 7 | | | | |
|---|---|---|---|---|---|
| | 14-Aug-03 | | | 18-Aug-03 | |
| | Shares | Price | Value | Price | Value |
| | Mediclin | 930 | 12074 | 975 | 12658 |
| 10789 | Grindrod | 752 | 10789 | 800 | 10789 |
| | Iliad | 315 | 12438 | 395 | 15597 |
| | ABSA | 3600 | 11801 | 3562 | 11676 |
| | Netcare | 382 | 11682 | 385 | 11774 |
| | Cashbil | 1700 | 16387 | 1820 | 17544 |
| | AFGRI | 485 | 11577 | 486 | 11601 |
| | Af Health | 1145 | 20337 | 1290 | 22912 |
| | Mustek | 511 | 20755 | 550 | 22339 |
| | Omnia | 1940 | 11570 | 1920 | 11451 |
| 10789 | | | | | 148341 |
| | | | | | 48.3 |
| | | | | 9041 | |
| | | | | | -19.7 |
| | | | | | 68.0 |

FIG. 6D

|  | New Portfolio, 8 | | | | |
|---|---|---|---|---|---|
| Sales | 18-Aug-03 | | | 9-Oct-03 | |
|  | Shares | Price | Value | Price | Value |
|  | Mediclin | 975 | 12658 | 1010 | 13112 |
|  | Grindrod | 800 | 10789 | 865 | 11666 |
|  | Iliad | 395 | 15597 | 400 | 15794 |
|  | ABSA | 3562 | 11676 | 3705 | 12145 |
|  | Netcare | 385 | 11774 | 427 | 13058 |
| 16667 | Altech | 2650 | 16437 | 2690 | 16685 |
|  | AFGRI | 485 | 11601 | 540 | 12890 |
| 21767 | Astrapak | 469 | 16437 | 544 | 19066 |
|  | Mustek | 550 | 22339 | 676 | 27457 |
| 10878 | Massmrt | 2230 | 16438 | 2620 | 19313 |
| 49312 |  |  |  |  | 161186 |
|  |  |  |  |  | 61.2 |
|  |  |  |  | 9432 |  |
|  |  |  |  |  | -16.2 |
|  |  |  |  |  | 77.4 |

|  | New Portfolio, 9 | | | | |
|---|---|---|---|---|---|
| Sales | 9-Oct-03 | | | 16-Oct-03 | |
|  | Shares | Price | Value | Price | Value |
|  | Mediclin | 1010 | 13112 | 1130 | 14670 |
|  | Grindrod | 865 | 11666 | 1000 | 13487 |
|  | Iliad | 400 | 15794 | 415 | 16386 |
|  | ABSA | 3705 | 12145 | 3825 | 12538 |
|  | Netcare | 427 | 13058 | 437 | 13364 |
| 15851 | Cashbil | 1650 | 15851 | 1835 | 17628 |
|  | AFGRI | 540 | 12890 | 535 | 12771 |
|  | Astrapak | 544 | 19066 | 540 | 18926 |
|  | Mustek | 676 | 27457 | 735 | 29853 |
|  | Massmrt | 2620 | 19313 | 2710 | 19976 |
|  |  |  |  |  | 169600 |
|  |  |  |  |  | 69.6 |
|  |  |  |  | 9656 |  |
|  |  |  |  |  | -14.2 |
|  |  |  |  |  | 83.8 |

FIG. 6E

| New Portfolio, 10 | | | | |
|---|---|---|---|---|
| 16-Oct-03 | | | 06-Dec-03 | |
| Shares | Price | Value | Price | Value |
| Mediclin | 1130 | 14670 | 1210 | 15709 |
| Grindrod | 1000 | 13487 | 1151 | 15524 |
| Iliad | 415 | 16386 | 515 | 20334 |
| ABSA | 3825 | 12538 | 4365 | 14308 |
| Netcare | 437 | 13364 | 500 | 15291 |
| Cashbil | 1835 | 17628 | 2000 | 19213 |
| AFGRI | 535 | 12771 | 547 | 13057 |
| Astrapak | 540 | 18926 | 628 | 22010 |
| Mustek | 735 | 29853 | 730 | 29650 |
| ABIL | 820 | 15977 | 975 | 22564 |

Sales (Portfolio 10): 15977

187660
87.7
9784
-13.1
100.7

| New Portfolio, 11 | | | | |
|---|---|---|---|---|
| 6-Dec-03 | | | 2-Feb-04 | |
| Shares | Price | Value | Price | Value |
| Mediclin | 1210 | 15709 | 1190 | 15449 |
| Grindrod | 1151 | 15524 | 1400 | 18882 |
| Iliad | 515 | 20334 | 505 | 19939 |
| ABSA | 4365 | 14308 | 4430 | 14521 |
| Netcare | 500 | 15291 | 467 | 14282 |
| Cashbil | 2000 | 19213 | 1700 | 16331 |
| AFGRI | 547 | 13057 | 576 | 13749 |
| Astrapak | 628 | 22010 | 780 | 27337 |
| Mustek | 730 | 29650 | 720 | 29244 |
| Unitrans | 2700 | 21436 | 2650 | 21039 |

Sales (Portfolio 11): 21436

|  | New Portfolio, 12 | | | | |
|---|---|---|---|---|---|
| Sales | 2-Feb-04 | | | 26-Feb-04 | |
|  | Shares | Price | Value | Price | Value |
|  | Mediclin | 1190 | 15449 | 1185 | 15384 |
|  | Grindrod | 1869 | 18882 | 1869 | 18882 |
|  | Iliad | 505 | 19939 | 501 | 19781 |
|  | ABSA | 4430 | 14521 | 4590 | 15045 |
|  | Netcare | 467 | 14282 | 446 | 13640 |
| 15514 | Connect | 565 | 15514 | 560 | 15377 |
|  | AFGRI | 576 | 13749 | 630 | 15038 |
|  | Astrapak | 780 | 27337 | 710 | 24884 |
| 27782 | ABIL | 967 | 27782 | 1100 | 31603 |
|  | Unitrans | 2650 | 21039 | 2645 | 20999 |
|  |  |  |  |  | 190633 |
|  |  |  |  |  | 97.0 |
|  |  |  |  | 10752 |  |
|  |  |  |  |  | -4.5 |
|  |  |  |  |  | 101.4 |

|  | New Portfolio, 13 | | | | |
|---|---|---|---|---|---|
| Sales | 26-Feb-04 | | | 19-Mar-04 | |
|  | Shares | Price | Value | Price | Value |
|  | Mediclin | 1185 | 15384 | 1245 | 16163 |
|  | Grindrod | 1869 | 25207 | 2010 | 27109 |
|  | Iliad | 501 | 19781 | 531 | 20965 |
|  | ABSA | 4590 | 15045 | 4630 | 15176 |
|  | Netcare | 446 | 13640 | 480 | 14680 |
|  | Connect Gp | 560 | 15377 | 540 | 14828 |
|  | AFGRI | 630 | 15038 | 630 | 15038 |
|  | Astrapak | 710 | 24884 | 740 | 25935 |
|  | ABIL | 1100 | 31603 | 1021 | 29333 |
| 19949 | Sasfin | 1000 | 19949 | 1100 | 21944 |
|  |  |  |  |  | 201171 |
|  |  |  |  |  | 101.2 |
|  |  |  |  | 10758 |  |
|  |  |  |  |  | -4.4 |
|  |  |  |  |  | 105.6 |

FIG. 6G

| | New Portfolio, 14 | | | | |
|---|---|---|---|---|---|
| Sales | 19-Mar-04 | | | 24-May-04 | |
| | Shares | Price | Value | Price | Value |
| | Mediclin | 1245 | 16163 | 1263 | 16397 |
| | Grindrod | 2010 | 27109 | 1905 | 25693 |
| | Iliad | 531 | 20965 | 515 | 20333 |
| | ABSA | 4630 | 15176 | 4575 | 14996 |
| | Netcare | 480 | 14680 | 440 | 13457 |
| | Connect | 540 | 14828 | 531 | 14581 |
| | AFGRI | 630 | 15038 | 598 | 14274 |
| 24639 | Hudaco | 2460 | 24639 | 2290 | 22936 |
| | ABIL | 1021 | 29333 | 1125 | 32321 |
| 20847 | Astral | 3100 | 20847 | 3360 | 22595 |
| | | | | | 197583 |
| | | | | | 97.6 |
| | | | | 10157 | |
| | | | | | -9.8 |
| | | | | | 107.3 |

| | New Portfolio, 15 | | | | |
|---|---|---|---|---|---|
| Sales | 24-May-04 | | | 26-Jul-04 | |
| | Shares | Price | Value | Price | Value |
| | Mediclin | 1263 | 16397 | 1190 | 15449 |
| | Grindrod | 1905 | 25693 | 2366 | 31911 |
| | Iliad | 515 | 20333 | 675 | 26650 |
| | ABSA | 4575 | 14996 | 5180 | 16979 |
| 12784 | Ellerina | 3160 | 12784 | 3730 | 15090 |
| | Connect | 531 | 14581 | 652 | 17904 |
| | AFGRI | 598 | 14274 | 599 | 14298 |
| | Hudaco | 2290 | 22936 | 2490 | 24939 |
| | ABIL | 1125 | 32321 | 1157 | 33240 |
| 21466 | Massmrt | 3075 | 21466 | 3380 | 23595 |
| | | | | | 22055 |
| | | | | | 120.1 |
| | | | | 10073 | |
| | | | | | -10.5 |
| | | | | | 130.6 |

FIG. 6H

|  | New Portfolio, 16 | | | | |
|---|---|---|---|---|---|
| Sales | 26-Jul-04 | | | 23-Sep-04 | |
| | Shares | Price | Value | Price | Value |
| | Mediclin | 1190 | 15449 | 1250 | 16228 |
| | Grindrod | 2366 | 31911 | 2555 | 34460 |
| | Iliad | 675 | 26650 | 724 | 28585 |
| | ABSA | 5180 | 16979 | 6275 | 20568 |
| | Ellerina | 3730 | 15090 | 3900 | 15778 |
| | Connect | 652 | 17904 | 720 | 19771 |
| | AFGRI | 599 | 14298 | 673 | 16064 |
| | Hudaco | 2490 | 24939 | 2630 | 26341 |
| | ABIL | 1157 | 33240 | 1295 | 37205 |
| 22415 | Santam | 5145 | 22415 | 5800 | 25269 |
| | | | | | 240269 |
| | | | | | 140.3 |
| | | | | 11515 | |
| | | | | | 2.3 |
| | | | | | 138.0 |

|  | New Portfolio, 17 | | | | |
|---|---|---|---|---|---|
| Sales | 23-Sep-04 | | | 15-Nov-04 | |
| Reinvst | Shares | Price | Value | Price | Value |
| 15417 | Pinnacle | 42 | 15417 | 49 | 17986 |
| | Grindrod | 2555 | 34460 | 3640 | 49094 |
| | Iliad | 724 | 28585 | 985 | 38889 |
| | ABSA | 6275 | 20588 | 0 | 0 |
| | Ellerina | 3900 | 15778 | 5050 | 20430 |
| | Connect | 720 | 19771 | 963 | 26444 |
| | AFGRI | 673 | 16064 | 740 | 17664 |
| 25024 | Argent | 675 | 25024 | 920 | 34107 |
| | ABIL | 1295 | 37205 | 1475 | 42376 |
| 24005 | Sasfin | 1520 | 24005 | 1680 | 26532 |
| | | | | | 273522 |
| | | | | | 195.5 |
| | | | | 12264 | |
| | | | | | 9.0 |
| | | | | | 186.5 |

FIG. 6I

| New Portfolio, 18 | | | | |
|---|---|---|---|---|
| 15-Nov-04 | | | 27-Nov-04 | |
| Shares | Price | Value | Price | Value |
| Pinnacle | 49 | 17986 | 53 | 19454 |
| Grindrod | 3640 | 49094 | 3950 | 53275 |
| Iliad | 985 | 38890 | 935 | 36916 |
| ABSA | 6700 | 21961 | 7240 | 23731 |
| Omnia | 4133 | 19409 | 4450 | 20898 |
| Connect | 963 | 26444 | 1000 | 27460 |
| AFGRI | 740 | 17663 | 720 | 17186 |
| Argent | 920 | 34107 | 970 | 35960 |
| ABIL | 1475 | 42376 | 1700 | 48841 |
| Sasfin | 1680 | 26532 | 1700 | 26848 |
| | | | | 310568 |
| | | | | 210.6 |
| | | | 12439 | |
| | | | | 10.5 |
| | | | | 200.0 |

Sales: 19409

| New Portfolio, 19 | | | | |
|---|---|---|---|---|
| 27-Nov-04 | | | 7-Dec-04 | |
| Shares | Price | Value | Price | Value |
| Pinnacle | 53 | 19454 | 54 | 19821 |
| Grindrod | 3950 | 53275 | 4000 | 53949 |
| Iliad | 935 | 36916 | 980 | 38692 |
| ABSA | 7240 | 23731 | 7220 | 23666 |
| Omnia | 4450 | 20898 | 4872 | 21941 |
| Connect | 1000 | 27460 | 999 | 27433 |
| Hiveld | 4600 | 16327 | 4300 | 15262 |
| Argent | 970 | 35960 | 984 | 38480 |
| ABIL | 1700 | 48841 | 1660 | 47691 |
| Sasfin | 1700 | 26848 | 1720 | 27164 |
| | | | | 312099 |
| | | | | 212.1 |
| | | | 12313 | |
| | | | | 9.4 |
| | | | | 202.7 |

Sales: 16327

FIG. 6J

|  | New Portfolio, 20 | | | | |
|---|---|---|---|---|---|
| Sales | 7-Dec-04 | | | 3-Jan-05 | |
|  | Shares | Price | Value | Price | Value |
|  | Pinnacle | 54 | 19821 | 50 | 18353 |
|  | Grindrod | 4000 | 53949 | 3950 | 53275 |
|  | Iliad | 980 | 38692 | 1020 | 40271 |
|  | ABSA | 7220 | 23666 | 7599 | 24908 |
|  | Omnia | 4672 | 21941 | 4798 | 22532 |
| 26061 | Santam | 7040 | 26061 | 7100 | 26283 |
|  | Hiveld | 4300 | 15262 | 4800 | 17037 |
|  | Argent | 984 | 36480 | 999 | 37036 |
|  | ABIL | 1660 | 47691 | 1843 | 52949 |
|  | Sasfin | 1720 | 27164 | 2200 | 34744 |
|  |  |  |  |  | 327388 |
|  |  |  |  |  | 227.4 |
|  |  |  |  | 12657 |  |
|  |  |  |  |  | 12.5 |
|  |  |  |  |  | 214.9 |

|  | New Portfolio, 21 | | | | |
|---|---|---|---|---|---|
| Sales | 7-Dec-04 | | | 19-Feb-05 | |
|  | Shares | Price | Value | Price | Value |
|  | Pinnacle | 50 | 18353 | 89 | 32668 |
|  | Grindrod | 3950 | 53275 | 4490 | 60558 |
| 38258 | Group 5 | 1515 | 38258 | 1485 | 37500 |
|  | ABSA | 7599 | 24908 | 7645 | 25059 |
|  | Omnia | 4798 | 22532 | 4591 | 21560 |
|  | Santam | 7100 | 26283 | 7700 | 28504 |
|  | Hiveld | 4800 | 17037 | 5860 | 20089 |
|  | Argent | 999 | 37036 | 1130 | 41893 |
| 50301 | Barworld | 10701 | 50301 | 10300 | 48416 |
|  | Sasfin | 2200 | 34744 | 2000 | 31585 |
|  |  |  |  |  | 347834 |
|  |  |  |  |  | 247.8 |
|  |  |  |  | 13303 |  |
|  |  |  |  |  | 18.2 |
|  |  |  |  |  | 229.6 |

FIG. 6K

|  | New Portfolio, 22 | | | | |
|---|---|---|---|---|---|
| Sales | 19-Feb-05 | | | 7-Mar-05 | |
|  | Shares | Price | Value | Price | Value |
|  | Pinnacle | 89 | 32668 | 82 | 30099 |
|  | Grindrod | 4490 | 60558 | 4815 | 64941 |
| 35625 | Super Gp | 1097 | 35625 | 1160 | 37671 |
|  | ABSA | 7645 | 25059 | 8040 | 26354 |
|  | Omnia | 4591 | 21560 | 4670 | 21931 |
|  | Santam | 7700 | 28504 | 7900 | 29244 |
|  | Hiveld | 5660 | 20089 | 5180 | 18385 |
|  | Argent | 1130 | 41893 | 1105 | 40966 |
|  | Barworld | 10300 | 48416 | 10600 | 49826 |
|  | Sasfin | 2000 | 31585 | 1995 | 31506 |
|  |  |  |  |  | 350924 |
|  |  |  |  |  | 250.9 |
|  |  |  |  | 13541 |  |
|  |  |  |  |  | 20.3 |
|  |  |  |  |  | 230.6 |

FIG. 6L

EVALUATION OF SECURITIES

FIELD OF THE INVENTION

This invention relates to a method for evaluating securities and, more particularly, to a method for evaluating the relative merits of a number of company shares, whether listed or not. The invention extends to a system of evaluating securities.

BACKGROUND TO THE INVENTION

There are many methodologies that can be used to evaluate share prices.

One such methodology, which is called technical analysis, is based on an assumption that prices tend to move in cycles, trends or patterns and that the future movements of a particular share price can be predicted from a study of charts of past behavior.

Another methodology is based on an assumption that the present price of a share reflects all past information about that share, because it represents the sum of the opinions of a large number of analysts and investors. The current market price of the share is thus assumed to follow a Markov process, in which future predictions of the share price can only be made on the basis of probability distributions.

A further methodology, referred to as fundamental analysis, is based on an assumption that a share possesses intrinsic value that can be determined from a careful study of a company's past and current performance. In contrast to the second methodology above, fundamentalists operate under an implicit assumption that sooner or later the market price of the share will move in a direction dictated by fundamental value. A question which plagues fundamentalists is how an investor or analyst should determine fundamental value in advance of such moves in a share price.

This invention is only concerned with fundamental analysis. In order to conduct fundamental analysis, it is first necessary to collect and examine information regarding the past performance of a company, together with an assessment of its strengths and weaknesses. Software to perform such fundamental analysis is known in the art; such fundamental analysis packages provide information relating to share capital, major shareholdings, net asset value ("NAV"), earnings, profits before and after tax, and dividends, cash, loans, margins, return on equity, debt-equity ratio and many other ratios. These fundamental analysis packages enable shares to be ranked according to any one or more of these variables at the instance of the analyst.

However, there is no consensus amongst analysts and investors as to what weight to attach to each of the above-mentioned criteria. Furthermore, the task is complicated by the fact that all the indicators relating to a particular share are not static, but constantly moving either up or down.

There is general agreement amongst analysts and investors, however, that one of the most significant indicators of a share's performance is an earnings trend of the underlying company. Most analysts, when reporting on the share, will make a forecast of earnings per share ("EPS") for a current financial year and probably for a year or two thereafter. The problem faced by such analysts and investors is how to translate that forecast into a valuation of the share.

An often-expressed opinion is that a standard method of valuing shares is not possible because of the number and variety of factors that have to be taken into account in such a valuation. Complexity of information should, however, not preclude a treatment of it in a standard manner. The same difficulties are faced when assessing the feasibility of a proposed new company project, whether internal or external. The object, both in relation to a project and a share, is to determine its value as an investment. In the case of the former, the standard methodology is to forecast a cash flow for a period such as, for example, ten years, together with a valuation of residual assets at the end of the period. The internal rate of return ("IRR") of the project is obtained by discounting these figures. There is no reason why this method should not be used to determine the IRR of a share purchase. A procedure would be to discount the forecast flow of dividends for a number of years, together with the proceeds of a notional sale at the end of the period.

The problem with this approach is that the major factor in the calculation, especially with high-growth shares, is pricing the notional sale at the end of the period being assessed. It is illogical to produce the fair price of a share today by a process that is critically dependent on an estimate of its value at some future time.

Analysts and financial writers repeatedly refer to "value" stocks, unlocking "value", embedded "value" and the like. It is never explained what the word "value" means, or how it can be measured. The private investor thus has no rational or authentic basis for his investment decisions.

A system for evaluating securities that alleviates some of these problems is described in South African patent number 2001/4855 ("ZA2001/4855").

ZA2001/4855 discloses a system and a method that enables the relative merit of a number of securities to be estimated. The relative merit of a security is expressed as a merit factor that is determined by dividing an estimated price-earnings ratio by a historical price-earnings ratio. The estimated price-earnings ratio (PE) is determined by the following recursive formula:

$$PE_k = \frac{(g^k + 100)(1 + PE_{k-1}C)}{C(100 + R)}$$

Where $k = 1, 2, 3 \ldots n,$ $$PE_0 = \frac{100}{RC}$$

and $$n = \frac{\log_{10} G}{\log_{10} g}$$

and where

R is a prescribed desired percentage return on investment

E is the last reported diluted headline earnings per share (HEPS)

C is a predetermined level of dividend cover at a predetermined level of growth under investigation G is an estimated growth rate in HEPS during the year following the last year of reporting, and g is an estimated attenuation ratio of the growth rate of HEPS, measured by the growth rate in one year divided by the growth rate in the next.

However, ZA2001/4855 gives no indication of how the attenuation rate g should be selected. As the estimated PE ratio, and therefore the merit ratio, is highly sensitive to the parameter g, a discrepancy in the value of g can significantly alter the merit rating of a security.

The implicit assumption that the value of the dividend cover C will remain constant irrespective of the level of annual earnings in the future represents another shortcoming in the system proposed by ZA2001/4855.

Furthermore, in the system described in ZA2001/4855, the historical PE ratio must be determined by updating the last reported earnings up to the present. This may be a period of up to twelve months, as the earnings of some securities are only reported annually. The historical PE ratio must be determined by updating the last reported earnings using the growth factor, G. However, where a significant number of months have passed since the last reported earnings, using the same factor of G for updating the last reported earnings to obtain the historical PE ratio and for determining the estimated PE ratio based on future earnings results in inaccuracies. This is because the short-term growth rate in the current year is often abnormally high or low due to transient circumstances.

Finally, in ZA2001/4855 the recursive formula listed above is used to create an array of $PE_k$ values that correspond to k=1,2,3 . . . n. The values of k correspond to year numbers, and it follows that the projected PE values are only reflected once for each forecast year. Because the calculated value of n may not be an integer, n must be rounded off to the nearest integer in order to select the value of $PE_k$ for k=n from the array of PE values referred to above. In cases where the attenuation rate g is high, the projected $PE_k$ values will differ significantly from year to year, resulting in significant rounding-off errors when n is rounded-off to an integer value.

OBJECT OF THE INVENTION

It is an object of this invention to provide a method and a system for evaluating securities that will, at least partially, alleviate some of the abovementioned problems.

SUMMARY OF THE INVENTION

In accordance with this invention there is provided a method of evaluating securities, comprising the steps of:
(a) estimating a P/E ratio for a security that will yield a predetermined rate of return on an investment in said security by:
  (i) applying a predetermined growth in earnings per share of the security for a period after the last historical reporting period; and
  (ii) attenuating the predetermined growth by an attenuation factor that is a function of a rating assessment based on the nature of the security;
(b) obtaining an actual historical P/E ratio for the security; and
(c) determining a merit rating for the security as a function of the estimated P/E ratio and of the historical P/E ratio of the security.

A further feature of the invention provides for the attenuation factor to be calculated by means of the formula:

$$g = \frac{(100G^{k_1} + k_2)}{(100G^{k_1} + k_2 - G)}$$

where
  g is the attenuation factor,
  G is the predetermined growth in earnings per share of the security, and
  $k_1$ and $k_2$ are constants.

Still further features of the invention provide for the rating assessment to be a number within a range in which the highest number corresponds to the most popular and predictable security and the lowest number corresponds to the least popular and most unpredictable security; and for $k_1$ and $k_2$ to be determined empirically by finding the solution to the above formula that best fits the average curve for the historical earning trends of companies that fall within the category corresponding to the rating assessment.

The invention extends to a method of evaluating securities, comprising the steps of:
(a) estimating a P/E ratio for a security that will yield a predetermined rate of return on an investment in said security as a function of:
  (i) a predetermined growth in earnings per share of the security for a period after the last historical reporting period;
  (ii) an attenuated growth in earnings per share; and
  (iii) a dividend cover that is a function of the attenuated growth in earnings per share;
(b) obtaining an actual historical P/E ratio for the security; and
(c) determining a merit rating for the security as a function of the estimated P/E ratio and of the historical P/E ratio of the security.

A further feature of the invention provides for the dividend cover to be calculated by means of the formula:

$$C = \frac{a}{b^\theta} + c\theta + d$$

where
  C is the dividend cover;
  a, b, c and d are constants; and
  θ is the attenuated growth in earnings per share and is determined by the formula $\theta = g^k$ where
  g is an attenuation factor; and
  k is a number in the series 1, 2, 3 . . . n Still further features of the invention provide for the constants a, b, c and d to be determined empirically as the solution to the curve that best fits a number of datum points comprising actual values of C and θ for a plurality of shares on a securities exchange.

The invention still further extends to a method of evaluating securities, Comprising the steps of:
(a) estimating a P/E ratio for a security that will yield a predetermined rate of return on an investment in said security as a function of a first predetermined growth in earnings per share of the security for a period after the last historical reporting period; and
(b) determining a current P/E ratio by extrapolating the last reported earnings using a second predetermined growth in earnings per share; and
(c) determining a merit rating for the security as a function of the estimated P/E ratio and of the current P/E ratio of the security.

Further features of the invention provide for the first predetermined growth in earnings to be selected on the basis of the long-term earnings growth forecast; and for the second predetermined growth in earnings to be selected on the basis of expected growth in the year following the last year of reporting.

The invention yet further extends to a method of evaluating securities, comprising the steps of:
(a) estimating a P/E ratio for a security that will yield a predetermined rate of return on an investment in said security by:

(i) applying a predetermined growth in earnings per share of the security for a period after the last historical reporting period; and
(ii) attenuating the predetermined growth by an attenuation factor in periods that are shorter than each successive reporting period;
(b) obtaining an actual historical P/E ratio for the security; and
(c) determining a merit rating for the security as a function of the estimated P/E ratio and of the historical P/E ratio of the security.

A further feature of the invention provides for the estimated P/E ratio, $PE_k$, for the security to be calculated according to a formula:

$$PE_k = \frac{(g^{Fk} + 100)\left(1 + PE_{k-\frac{1}{F}}C\right)}{C(100 + R)}$$

Where $k = 1, 2, 3 \ldots n$ $$PE_0 = \frac{100}{RC}$$

and $$n = \frac{\log_{10} G}{F \log_{10} g}$$

where

F is the sample period as a fraction of a year,

R is a prescribed desired percentage return on investment,

E is the last reported diluted headline earnings per share (HEPS)

C is the dividend cover at a level of earnings growth rate under investigation,

G is an estimated growth rate in HEPS during the year following the last year of reporting, and g is an estimated attenuation ratio of the growth rate of HEPS, measured by the growth rate in one year divided by the growth rate in the next.

In accordance with the invention there is further provided a system for evaluating securities, comprising a processor configured to:

(a) estimate a P/E ratio for a security that will yield a predetermined rate of return on an investment in said security by:
(i) applying a predetermined growth in earnings per share of the security for a period after the last historical reporting period; and
(ii) attenuating the predetermined growth by an attenuation factor that is a function of a rating assessment based on the nature of the security; and (b) determine a merit rating for the security as a function of the estimated P/E ratio and of an actual historical P/E ratio of the security;

and having output means for displaying the merit rating to the user in a perceptible form.

Further features of the invention provide for the attenuation factor to be calculated by means of a formula:

$$g = \frac{(100G^{k_1} + k_2)}{(100G^{k_1} + k_2 - G)}$$

where g is the attenuation factor,

G is the predetermined growth in earnings per share of the security, and $k_1$ and $k_2$ are constants.

Still further features of the invention provide for $k_1$ and $k_2$ to be calculated by selecting a rating assessment that is a number within a range in which the highest number corresponds to the most popular and predictable security and the lowest number corresponds to the least popular and most unpredictable security, and empirically determining the solution to the formula that best fits the average curve of the historical earning trends of companies that fall within the categories corresponding to the rating assessments.

The invention extends to a system for evaluating securities, comprising a processor configured to:

(a) estimate a P/E ratio for a security that will yield a predetermined rate of return on an investment in said security as a function of:
(i) a predetermined growth in earnings per share of the security for a period after the last historical reporting period;
(ii) an attenuated growth in earnings per share; and
(iii) a dividend cover that is a function of the attenuated growth in earnings per share; and (b) determine a merit rating for the security as a function of the estimated P/E ratio and of an actual historical P/E ratio of the security;

and having output means for displaying the merit rating to the user in a perceptible form.

Further features of the invention provide for the dividend cover to be calculated by means of a formula:

$$C = \frac{a}{b^\theta} + c\theta + d$$

where

C is the dividend cover;

a, b, c and d are constants; and $\theta$ is the attenuated growth in earnings per share and is determined by the formula $\theta = g^k$ where g is an attenuation factor; and k is a number in the series 1, 2, 3 . . . n Still further features of the invention provide for the constants a, b, c and d to be determined empirically as the solution to the curve that best fits a number of datum points comprising actual values of C and $\theta$ for a plurality of shares on a securities exchange.

The invention further extends to a system for evaluating securities, comprising a processor configured to:

(a) estimate a P/E ratio for a security that will yield a predetermined rate of return on an investment in said security as a function of
(i) a first predetermined growth in earnings per share of the security for a period after the last historical reporting period; and
(ii) an actual historical P/E ratio for the security; and (b) determine a current P/E ratio by extrapolating the last reported earnings using a second predetermined growth in earnings per share; and (c) determine a merit rating for the security as a function of the estimated P/E ratio and of the current P/E ratio of the security;

and having output means for displaying the merit rating to the user in a perceptible form.

Further features of the invention provide for the first predetermined growth in earnings to be selected on the basis of the long-term earnings growth forecast; and for the second predetermined growth in earnings to be selected on the basis of expected growth in the year following the last year of reporting.

The invention still further extends to a system for evaluating securities, comprising a processor configured to:

(a) estimate a P/E ratio for a security that will yield a predetermined rate of return on an investment in said security by:
  (i) applying a predetermined growth in earnings per share of the security for a period after the last historical reporting period; and
  (ii) attenuating the predetermined growth by an attenuation factor in periods that are shorter than each successive reporting period; and
(b) determine a merit rating for the security as a function of the estimated P/E ratio and of an actual historical P/E ratio of the security;

and having output means for displaying the merit rating to the user in a perceptible form.

Further features of the invention provide for the computation facility to compute the estimated P/E ratio, $P/E_k$, for the security according to the recursive equation:

$$PE_k = \frac{(g^{Fk} + 100)\left(1 + PE_{k-\frac{1}{F}} C\right)}{C(100 + R)}$$

Where $k = 1, 2, 3 \ldots n$ $PE_0 = \frac{100}{RC}$ and $n = \frac{\log_{10} G}{F \log_{10} g}$ where
  F is the sample period as a fraction of a year,
  R is a prescribed desired percentage return on investment,
  E is the last reported diluted headline earnings per share (HEPS)
  C is a predetermined level of dividend cover at a predetermined level of growth under investigation,
  G is an estimated growth rate in HEPS during the year following the last year of reporting, and
  g is an estimated attenuation ratio of the growth rate of HEPS, measured by the growth rate in one year divided by the growth rate in the next.

BRIEF DESCRIPTION OF THE DRAWINGS

The invention will be described, by way of example only, with reference to the accompanying drawings in which:

FIG. 2 is an example of a merit rating for a plurality of securities, in a perceptible form, produced by the system of FIG. 1;

FIG. 5 A-D, consisting of FIG. 5A to FIG. 5D, is an example of a merit rating for a plurality of securities, in a perceptible form; and FIG. 6 A-L, consisting of FIG. 6A to FIG. 6L, shows an actual investment portfolio managed using the system for evaluating shares of the present invention.

DETAILED DESCRIPTION OF THE DRAWINGS

Figure 1:
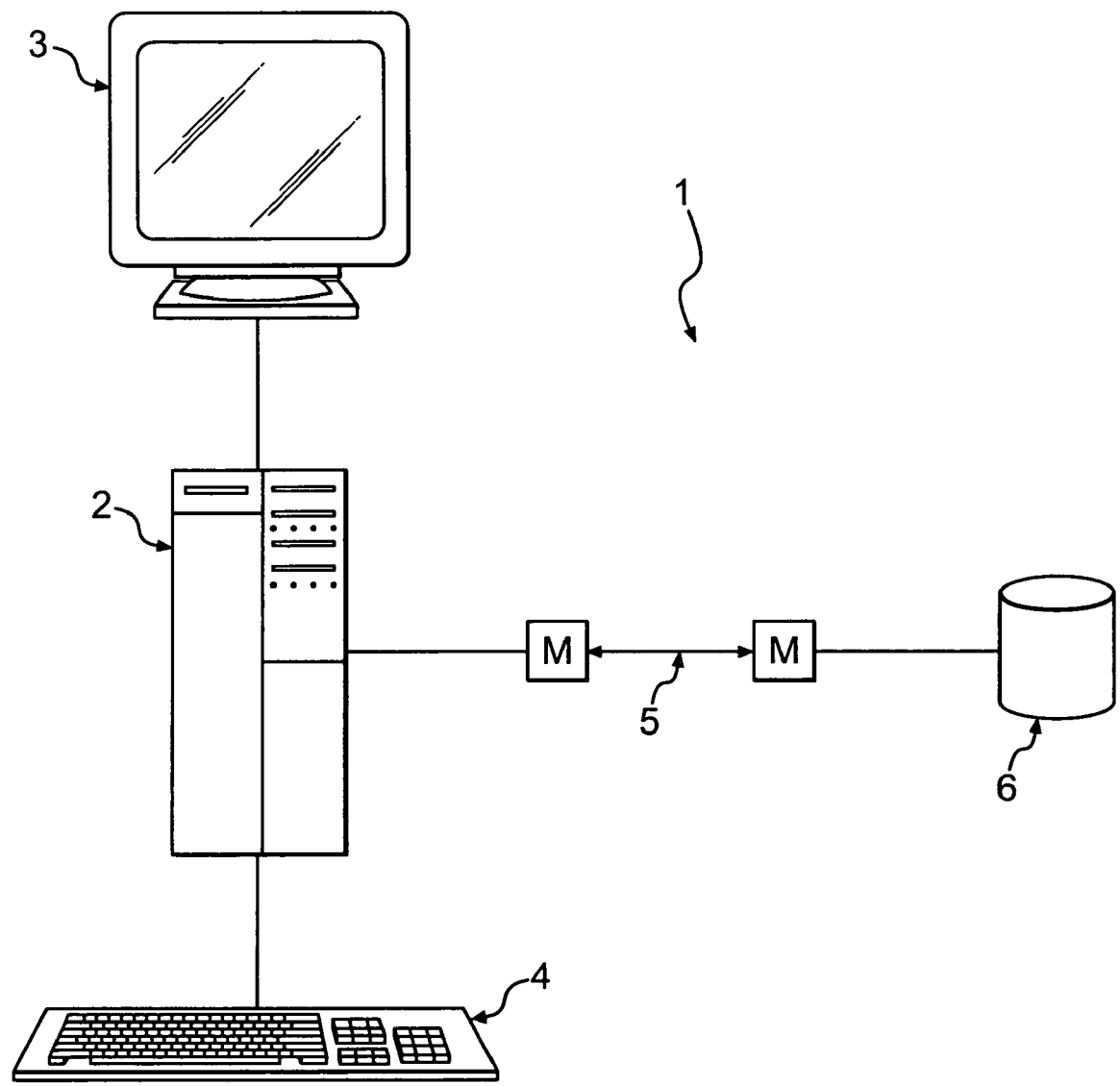
FIG. 1 is a functional block diagram of a prior art system for evaluating securities.

In FIG. 1, a system for evaluating securities is indicated by the reference numeral (1).

The system (1) includes a computer workstation (2) having a processor (not shown) and a display monitor (3), a keyboard (4) and a telecommunication link (5) to a real-time online database (6) of securities data such as share prices, and the like. The processor operates under control of a stored program in the form of a spreadsheet program such as Microsoft Excel which is available from the Microsoft Corporation of Seattle, USA. The spreadsheet program runs a spreadsheet that operates according to a method of evaluating each one of the plurality of securities such as listed shares, the operation of which will be described in more detail in the description that follows.

In order to evaluate any one of the shares, the following input parameters are required:

R is a prescribed desired percentage return on an investment in the share, say 13 percent.

E is a last reported diluted earning per share (EPS).

C is a predetermined level of dividend cover, say 2,5, at a predetermined level of growth under investigation.

G is an estimated growth rate in EPS for a year following the last year of reporting.

g is an estimated attenuation ratio of the growth in EPS looking forward.

The price of the share is normalized at a price of 100 currency units, for convenience.

The spreadsheet computes an estimated P/E ratio, $P/E_k$ for the share according to the following recursive equation:

$$PE_k = \frac{(g^k + 100)(1 + PE_{k-1} C)}{C(100 + R)}$$

Where $k = 1, 2, 3 \ldots n,$ $PE_0 = \frac{100}{RC}$ and n is determined by means of the formula $$n = \frac{\log_{10} G}{\log_{10} g}$$

The spreadsheet program can be utilized to evaluate the plurality of shares simultaneously. In order to do so, the above input parameters must be entered for each one of the shares and evaluated. The spreadsheet program then calculates an estimated P/E ratio for each one of the plurality of shares according to the recursive equation presented above.

In order to utilize the system (1) more effectively to rank the relative worth of the plurality of shares, it is necessary for a user to enter the above input parameters in respect of each one of the plurality of shares under investigation. The spreadsheet then produces an estimated P/E ratio for each one of the plurality of shares as described above. The user is also required to enter, in respect of each one of the plurality of shares under investigation, an actual P/E ratio for the last reporting period or, alternatively, price and earnings data from which the P/E ratio may be computed. The spreadsheet computes a merit rating for each one of the plurality of shares, which is simply a ratio of the estimated P/E ratio and the historical P/E ratio of the share. The spreadsheet also produces a ranking of the plurality of shares under analysis in accordance with the merit ratings.

Referring to FIG. 2, a printed output of an evaluation of a plurality of shares is presented. The output consists of a table, the columns of which input data or the results of the analysis described above. The columns are labeled by means of letters for convenience. Column A indicates the names of the plurality of shares and column B is the corresponding ruling market prices. Column C represents the last reported annual diluted headline earnings per share. Column D is the true current P/E ratios for the plurality of shares which are obtained by dividing the ruling market price (Column B) by the headline earnings per share (Column C). Column E is an estimate of the growth rate, G, in EPS for the current financial year. Column F is an estimated attenuation ratio, g, of the growth in EPS looking forward. Column G are the values of n for each one of the shares, as determined according to the above equation. Column H is the estimated P/E ratios computed by the spreadsheet according to the recursive equation described above, and column I is the merit rating for each one of the plurality of shares, computed as a ratio of the estimated P/E ratio (Column H) divided by and the true current P/E ratio (Column D) of the share. In the printed output, the shares are ranked in order, from those with highest merit rating to those with the lowest merit rating at the bottom of the list.

It will be appreciated by those skilled in the art that the relative merit ratings of the plurality of shares under investigation provide an investor with the relative merit of the shares with a view to achieving the prescribed desired percentage return, R, on an investment in any one of the shares. A typical output of the spreadsheet program is illustrated in FIG. 2. An investor will tend to purchase shares with highest merit ratings and sell off those with smallest merit ratings. As long as the earnings and growth input parameters for the shares are unchanged, as a share becomes cheaper, it will move up in the merit ratings, or downwards when it becomes more expensive. The effectiveness of the system (1) in analyzing securities such as shares depends on the quality of the input parameters G and g that are selected for each one of the plurality of shares.

Numerous modifications are possible to this embodiment without departing from the scope of the invention. In particular, a different recursive equation may be utilized to compute an estimated P/E ratio for each one of the plurality of shares. Further, a different merit rating may be utilized in assessing the relative merit of the shares, such as an absolute value of the difference between the estimated and the reported P/E's. Still further, the stored program that controls the operation of the computer workstation (2) may be a bespoke executable computer program instead of an Excel spreadsheet. The ruling market prices and the last reported headline earnings per share may be automatically downloaded from the real-time online database (6) of securities data along the telecommunication link (5), or may be entered manually be a user if this facility is not available.

The system and method thus far described are disclosed in ZA2001/4855.

In accordance with the present invention, a system and a method is disclosed which further provides for the attenuation rate g to be a function of a rating assessment selected by the user that is based on the nature of the security.

Research into the historical earnings trends of companies has shown that when growth is higher than about 20% it is prudent to forecast a progressively higher rate of attenuation. The rate of attenuation as a function of growth can be fitted to a curve having the following form:

$$g = \frac{(100G^{k_1} + k_2)}{(100G^{k_1} + k_2 - G)}$$

where
g is the attenuation factor,
G is the predetermined growth in earnings per share of the security, and
$k_1$ and $k_2$ are predetermined constants based on the rating assessment.

It has also been found that, generally, the market consistently favors certain classes of companies and awards their shares higher price ratings than other less popular shares with ostensibly the same input parameters. The reason for this appears to be that the market considers their particular growth rates to be more sustainable and stable.

In order to account for this factor, a "star rating" system is provided by which the attenuation rate g is a function of a rating assessment selected by the user that is based on the nature of the security. According to this aspect of the invention, a rating assessment r is selected on the basis of how popular and stable a security is perceived by the user to be. Typical examples of South African companies corresponding to various rating assessments are the following:

***** (r=5) "Big four" banks and insurance companies and large industrial corporations with international operations;

**** (r=4) Large local industrial concerns and major retailers with records of consistent growth; mining houses;

*** (r=3) "Mid-cap" manufacturing companies and smaller retailers; property companies;

** (r=2) A variety of smaller and less well known companies with good profit histories; large companies whose reports neglect to comment on future prospects;

* (r=1) Companies of all descriptions with erratic performance; "small cap" stocks and all other companies whose reports neglect to comment on prospects;

(r=0) Any companies, small or large, whose futures appear particularly unpredictable.

The constants $k_1$ and $k_2$ above are then determined empirically as the solution to the above equation that best fits the average curve of the historical earning trends of companies that fall within the categories broadly defined by the rating assessment.

Figure 3:
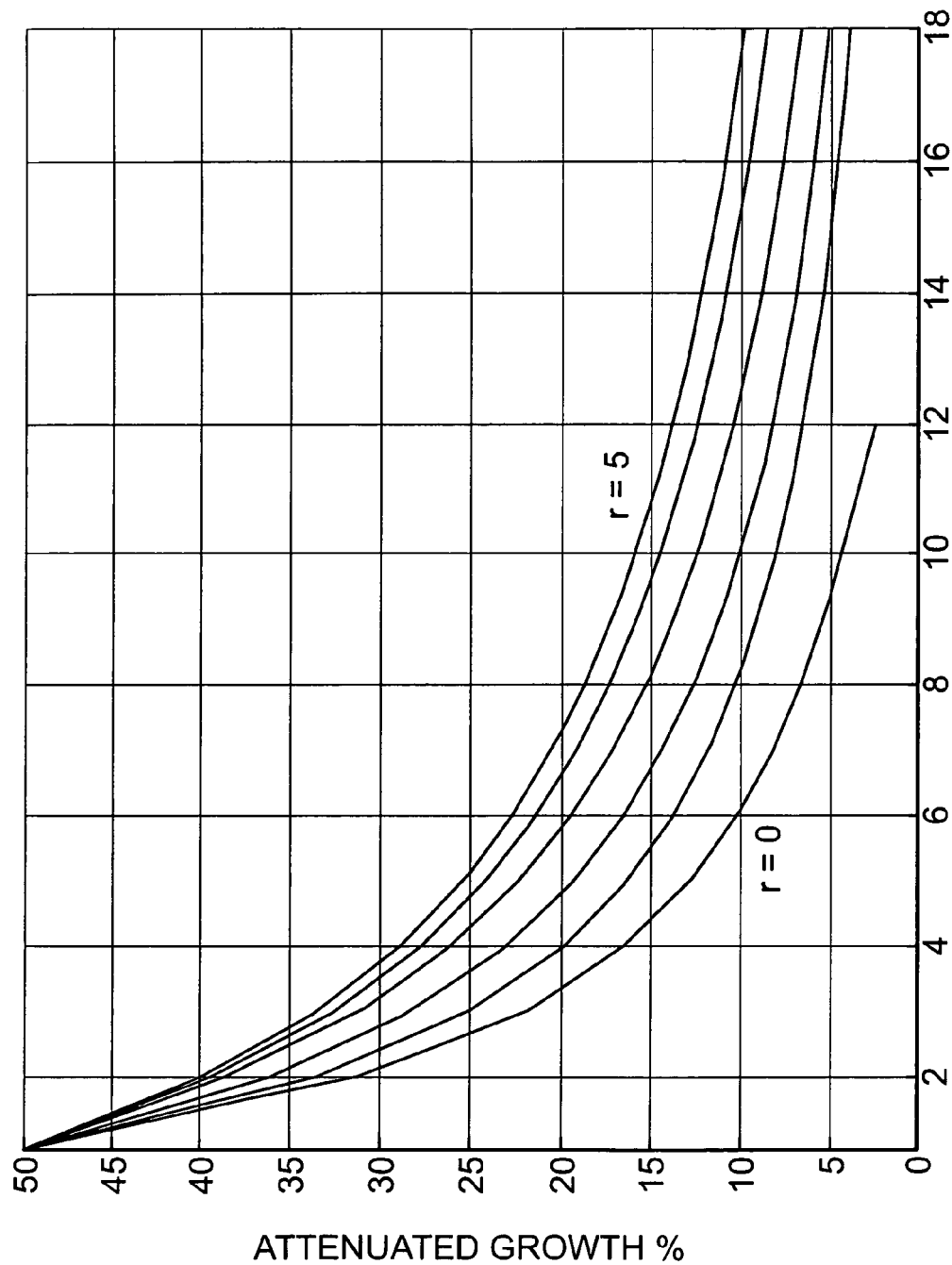
FIG. 3 is a graph of the projected attenuated growth for a single security according to star ratings.

Research of the historical earning trends of companies on the Johannesburg stock exchange resulted in the set of solutions listed below:

for r=5, $k_1$ is about 0.133 and $k_2$ is about 81.6;
for r=4, $k_1$ is about 0.193 and $k_2$ is about 22.2;
for r=3, $k_1$ is about 0.247 and $k_2$ is about 45;
for r=2, $k_1$ is about 0.230 and $k_2$ is about 65;
for r=1, $k_1$ is about 0.206 and $k_2$ is about 74.9;
for r=0, $k_1$ is about 0.237 and $k_2$ is about 121.1;

These solutions will, of course, vary depending on the securities exchange of interest and the nature of the historical earning trends of companies. FIG. 3 shows a graph of attenuating growth rates for each class of securities corresponding to each of the star ratings r=5 to r=0, using the values of $k_1$ and $k_2$ set out above. For illustrative purposes, the graph covers a range of growth rates up to 50%, but the curves generated by the formulae could extend above that growth figure. It is to be understood that the years indicated on the horizontal axis are only relevant in that they show intervals of a year, as the future growth trajectory of a particular security may start at a growth rate corresponding to any point on the applicable curve. Given a predetermined growth rate, G, for a particular share, the rate of attenuation at that growth rate is dependent on the gradient of the applicable curve where it intersects the horizontal G % growth line. The corresponding attenuation factor, g, is given by substituting that value for G in the formula together with the values for $k_1$ and $k_2$ applicable to the predetermined star rating for that share.

A second improvement to the above system is the determination of the dividend cover C, which is the ratio of earnings to dividend, as a function of an attenuated growth in earnings per share G.

It is well known that companies with a high growth rate are likely to pay out dividends that are a smaller proportion of current earnings. They therefore have a higher dividend cover than companies whose earnings are growing at a slower rate. If follows that when a company's present growth rate is high and that growth rate is forecast to diminish, the dividend cover should increase.

This relationship can be represented by an exponential equation as follows:

$$C = \frac{a}{b^\theta} + c\theta + d$$

where

C is the dividend cover;

a, b, c and d are constants; and $\theta$ is the attenuated growth in earnings per share and is determined by the formula $\theta = g^k$ where g is an attenuation factor; and k is a number in the series 1, 2, 3 ... n The constants a, b, c and d are determined empirically as the solution to the curve that best fits a number of datum points comprising actual values of C and $\theta$ for a plurality of shares on a securities exchange.

Research on the historical growth in earning per share plotted against dividend cover for a large number of random shares on the Johannesburg stock exchange resulted in the set of solutions listed below:

a=0.83, b=0.92, c=0.072, and d=1.67

Figure 4:
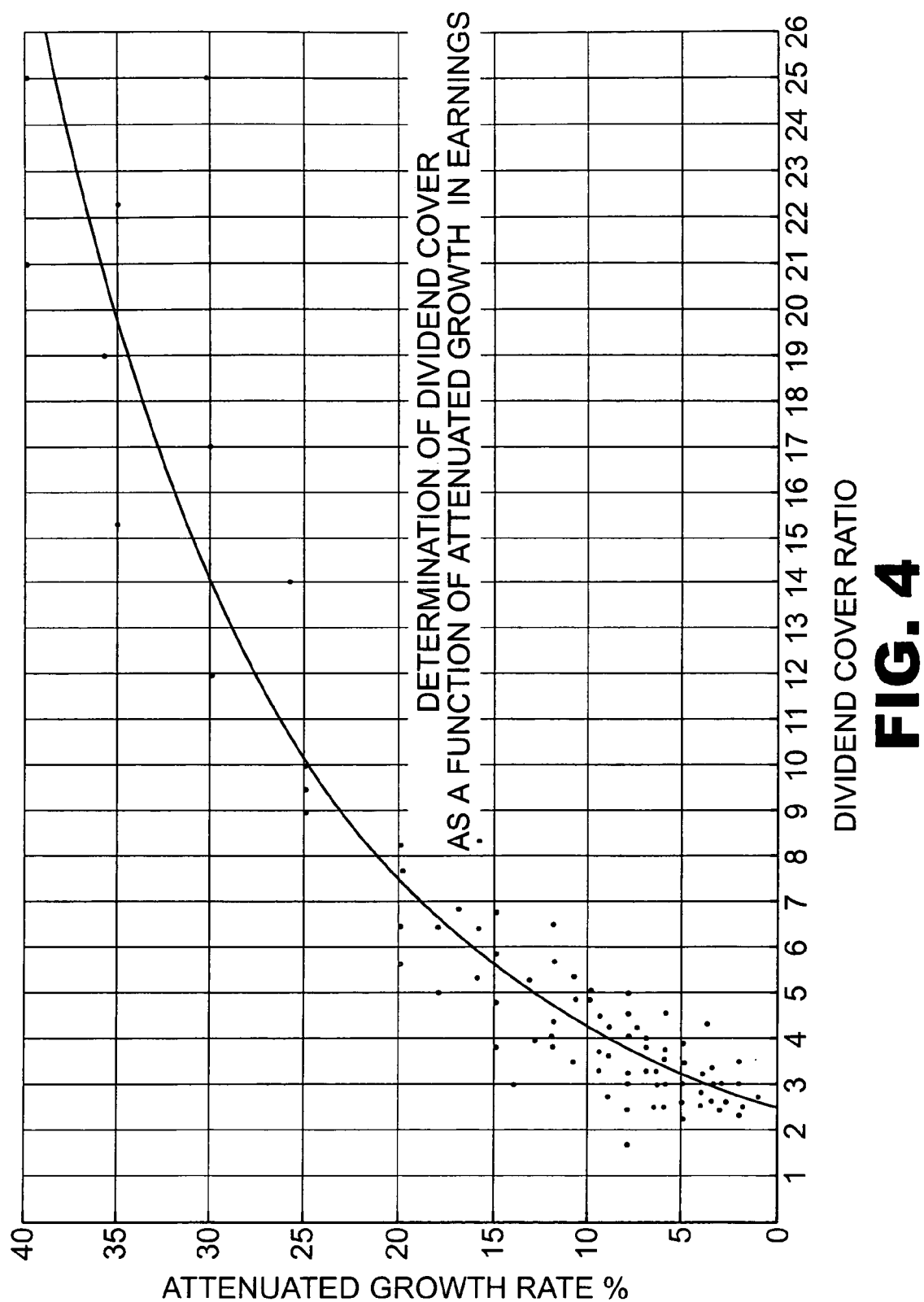
FIG. 4 is a graph illustrating the determination of dividend cover as a function of attenuated growth in earnings.

An illustration of the curve that best fits a number of datum points for a random number shares on the Johannesburg is shown in FIG. 4. This curve is used to determine the set of solutions listed above.

These solutions will, of course, vary depending on the securities exchange of interest and the time at which the data is acquired.

A third improvement to the system above is the use of two growth factors instead of one.

The current growth factor G is defined as the estimated percentage growth rate in headline earnings per share (HEPS) during the year following the last year of reporting, in other words, the current financial year. However, the same factor, G, has to be used in the system to update the HEPS in the last reported year to a figure concurrent with the present price in order to calculate the present P/E ratio.

The rate of earnings growth in the current year, however, is often known to be of a transient character due, for example, to an abnormal commodity price, exchange rate or acquisition. If performance in the present year is believed to be in any way exceptional, using the estimated growth for predicting the long-term forecast of earnings growth will result in significant errors.

To address this problem, the present invention provides two separate growth rates, $G_1$ and $G_2$, where:

$G_1$ is the estimated percentage growth rate in the current financial year, and $G_2$ is the estimated long-term percentage growth rate.

By using $G_1$ for updating the HEPS in the last reported year to a figure concurrent with the present price, and using $G_2$ as the datum on which to base the long-term forecast, in other words, substituting G in all the equations with $G_2$, the described problem can be alleviated.

A fourth improvement to the system is calculating the estimated P/E ratio using a recursive equation with periods that are shorter than each successive reporting period.

In ZA2001/4855 the recursive formula listed is used to create an array of $PE_k$ values that correspond to k=1,2,3 ... n. The values of k correspond to year numbers, and it follows that the projected PE values are only reflected once for each forecast year. Because the calculated value of n need not be an integer, n must be rounded off to the nearest integer in order to compute the value of $PE_k$ for k=n. In cases where the attenuation rate g is high, the projected $PE_k$ values will differ significantly from year to year, resulting in significant rounding-off errors if n is to assume an integer value.

In order to overcome this problem, a modified recursive formula is disclosed in the present invention that uses recursive periods that are shorter than each successive reporting period.

The estimated P/E ratio, $P/E_k$, is now computed according to the recursive equation:

$$PE_k = \frac{(g^{Fk} + 100)\left(1 + PE_{k-\frac{1}{F}} C\right)}{C(100 + R)}$$

Where $k = 1, 2, 3 ... n$ $$PE_0 = \frac{100}{RC}$$

and $n = \frac{\log_{10} G}{F \log_{10} g}$ where

F is the sample period as a fraction of a year,

R is a prescribed desired percentage return on investment,

E is the last reported diluted headline earnings per share (HEPS)

C is a predetermined level of dividend cover at a predetermined level of growth under investigation, G is an estimated growth rate in HEPS during the year following the last year of reporting, and g is an estimated attenuation ratio of the growth rate of HEPS, measured by the growth rate in one year divided by the growth rate in the next.

F can be any predetermined fraction of a year, but 0.5 (corresponding to 6 months) has been found to substantially reduce the rounding-off errors described above.

FIG. 5 shows a printed output of an evaluation of a plurality of shares in accordance with the invention. The output consists of a table similar to the table shown in FIG. 2, but in which the improvements described in this specification have been implemented. A column showing the application of two growth factors and a column showing the star rating are shown. The other improvements are executed in background software and are therefore not visible.

FIG. 6 shows the ongoing record of a monitored investment portfolio managed using the system and the method of the invention. The investment portfolio illustrated shows ten shares and their closing share prices on the days indicated during the period April 2002 to February 2005. Details of the notional sales and reinvestment of shares are included. A nominal 'transaction cost' of 5% is deducted from the proceeds of each sale before reinvesting. From April 2002 to February 2005 the portfolio grew by 250.9%. For this same period the All Share Index on the Johannesburg Stock Exchange experienced a gain of only 20.3%.

FIG. 6 illustrates the value of the method and system for evaluating securities of the present invention over the prior art. The invention provides investors with an effective tool in evaluating the relative merit of a number of securities.

What is claimed is:

1. A computer implemented method of evaluating securities comprising the steps of:
    electrically estimating a price per earning (P/E) ratio for a security that will yield a predetermined rate of return on an investment in said security, wherein the estimating step further comprises:
        applying a predetermined growth in earnings per share of the security for a period after a last historical reporting period; and
        attenuating the predetermined growth by an attenuation factor that is a function of a rating assessment based on the security;
    obtaining an actual historical P/E ratio for the security;
    determining a merit rating for the security as a function of the estimated P/E ratio the actual historical P/E ratio of the security; and
    electrically evaluating the security using the determined merit rating.

2. A computer implemented method as claimed in claim 1 in which the attenuation factor is calculated using the formula:

$$g = \frac{(100G^{k_1} + k_2)}{(100G^{k_1} + k_2 - G)}$$

where
g is the attenuation factor,
G is the predetermined growth in earnings per share of the security, and
$k_1$ and $k_2$ are constants.

3. A computer implemented method as claimed in claim 2 in which the rating assessment is a number within a range with an upper range corresponding to a most popular and predictable security, and a lower range corresponding to a least popular and most unpredictable security.

4. A computer implemented method as claimed in claim 3 in which $k_1$ and $k_2$ are determined empirically by finding a solution to the formula that best fits an average curve for a historical earning trends of companies that fall within a category corresponding to the rating assessment.

5. A computer implemented method of evaluating securities comprising the steps of:
    electrically estimating a price per earning (P/E) ratio for a security that will yield a predetermined rate of return on an investment in said security as a function of:
        a predetermined growth in earnings per share of the security for a period after a last historical reporting period;
        an attenuated growth in earnings per share; and
        a dividend cover that is a function of the attenuated growth in earnings per share;
    obtaining an actual historical P/E ratio for the security;
    determining a merit rating for the security as a function of the estimated P/E ratio and of the actual historical P/E ratio of the security; and electrically evaluating the security using the determined merit rating.

6. A computer implemented method as claimed in claim 5 in which the dividend cover is calculated using the formula:

$$C = \frac{a}{b^\theta} + c\theta + d$$

where
C is the dividend cover;
a, b, c and d are constants; and
θ is the attenuated growth in earnings per share and is determined by the formula $\theta = g^k$ where
g is an attenuation factor; and
k is a number in the series 1, 2, 3 . . . n.

7. A computer implemented method as claimed in claim 6 in which the constants a, b, c and d are determined empirically as a solution to the curve that best fits a number of datum points comprising actual values of C and θ for a plurality of shares on a securities exchange.

8. A computer implemented method of evaluating securities comprising the steps of:
    electrically estimating a price per earning (P/E) ratio for a security that will yield a predetermined rate of return on an investment in said security as a function of a first predetermined growth in earnings per share of the security for a period after a last historical reporting period;
    electrically determining a current P/E ratio by extrapolating a last reported earnings for the period after the last historical reporting period, using a second predetermined growth in earnings per share;
    electrically determining a merit rating for the security as a function of the estimated P/E ratio and a current P/E ratio of the security; and
    electrically evaluating the security using the determined merit rating.

9. A computer implemented method as claimed in claim 8 in which the first predetermined growth in earnings per share is selected on the basis of a long-term earnings growth forecast, and the second predetermined growth in earnings is selected on the basis of expected growth in a year following the last historical reporting period.

10. A computer implemented method of evaluating securities, comprising the steps of:

electrically estimating a price per earning (P/E) ratio for a security that will yield a predetermined rate of return on an investment in said security by:

applying a predetermined growth in earnings per share of the security for a period after a last historical reporting period; and attenuating the predetermined growth by an attenuation factor in periods that are shorter than each successive reporting period;

obtaining an actual historical P/E ratio for the security;

determining a merit rating for the security as a function of the estimated P/E ratio and the actual historical P/E ratio of the security; and electrically evaluating the security using the determined merit rating.

11. A computer implemented method as claimed in claim 10 in which the estimated P/E ratio is calculated using the formula:

$$PE_k = \frac{(g^{Fk} + 100)\left(1 + PE_{k-\frac{1}{F}} C\right)}{C(100 + R)}$$

Where $k = 1, 2, 3 \ldots n$ $$PE_0 = \frac{100}{RC}$$

and $n = \frac{\log_{10} G}{F \log_{10} g}$ and where F is the sample period as a fraction of a year, R is a prescribed desired percentage return on investment, E is the last reported diluted headline earnings per share (HEPS), C is a predetermined level of dividend cover at a predetermined level of growth under investigation, G is an estimated growth rate in HEPS during the year following the last year of reporting, and g is an estimated attenuation ratio of the growth rate of HEPS, measured by the growth rate in one year divided by the growth rate in the next.

12. A system for evaluating securities comprising:

a processor configured to:

estimate a price per earning (P/E) ratio for a security that will yield a predetermined rate of return on an investment in said security by:

applying a predetermined growth in earnings per share of the security for a period after the last historical reporting period; and attenuating the predetermined growth by an attenuation factor that is a function of a rating assessment based on the security;

determine a merit rating for the security as a function of the estimated P/E ratio and of an actual historical P/E ratio of the security;

evaluate the security using the determined merit rating; and output means for displaying a result of the evaluation of the security.

13. A system as claimed in claim 12 in which the attenuation factor is calculated using the formula:

$$g = \frac{(100G^{k_1} + k_2)}{(100G^{k_1} + k_2 - G)}$$

where g is the attenuation factor,

G is the predetermined growth in earnings per share of the security, and $k_1$ and $k_2$ are constants.

14. A system as claimed in claim 13 in which $k_1$ and $k_2$ are calculated by selecting a rating assessment that is a number within a range with an upper range corresponding to a most popular and predictable security, and a lower range corresponding to a least popular and most unpredictable security, and empirically determining a solution to said formula that best fits an average curve of historical earning trends of companies that fall within a category corresponding to the rating assessment.

15. A system for evaluating securities comprising:

a processor configured to:

estimate a price per earning (P/E) ratio for a security that will yield a predetermined rate of return on an investment in said security as a function of:

a predetermined growth in earnings per share of the security for a period after a last historical reporting period; and an attenuated growth in earnings per share;

a dividend cover that is a function of the attenuated growth in earnings per share;

determine a merit rating for the security as a function of the estimated P/E ratio and of an actual historical P/E ratio of the security; and evaluate the security using the determined merit rating: and output means for displaying a result of the evaluation of the security.

16. A system as claimed in claim 15 in which the dividend cover is calculated by using the formula:

$$C = \frac{a}{b^\theta} + c\theta + d$$

where

C is the dividend cover;

a, b, c and d are constants; and

θ is the attenuated growth in earnings per share and is determined by the formula $\theta = g^k$ where g is an attenuation factor; and k is a number in the series 1, 2, 3 . . . n.

17. A system as claimed in claim 16 in which the constants a, b, c and d are determined empirically as a solution to a curve that best fits a number of datum points comprising actual values of C and θ for a plurality of shares on a securities exchange.

18. A system for evaluating securities comprising:

a processor configured to:

estimate a price per earning (P/E) ratio for a security that will yield a predetermined rate of return on an investment in said security as a function of a first predetermined growth in earnings per share of the security for a period after a last historical reporting period; and an actual historical P/E ratio for the security;
determine a current P/E ratio by extrapolating a last reported earnings during the last historical reporting period, using a second predetermined growth in earnings per share;
determine a merit rating for the security as a function of the estimated P/E ratio and of the current P/E ratio of the security; and
evaluate the security using the determined merit rating; and output means for displaying a result of the evaluation of the security.

19. A system as claimed in claim 18 wherein the first predetermined growth in earnings per share is selected according to a long-term earnings growth forecast and a second predetermined growth in earnings is selected according to the expected growth in the year following the last historical reporting period.

20. A system for evaluating securities comprising:
a processor configured to:
  estimate a price per earning (P/E) ratio for a security that will yield a predetermined rate of return on an investment in said security by:
    applying a predetermined growth in earnings per share of the security for a period after the last historical reporting period; and
    attenuating the predetermined growth by an attenuation factor in periods that are shorter than each successive reporting period;
  determine a merit rating for the security as a function of the estimated P/E ratio and of an actual historical P/E ratio of the security; and
  evaluate the security using the determined merit rating; and
output means for displaying a result of the evaluation of the security.

21. A system as claimed in claim 20 in which the estimated P/E ratio, $P/E_k$, for the security is calculated according to the recursive equation:

$$PE_k = \frac{(g^{Fk} + 100)\left(1 + PE_{k-\frac{1}{F}}C\right)}{C(100 + R)}$$

Where $k = 1, 2, 3 \ldots n$ $$PE_0 = \frac{100}{RC}$$

and $n = \dfrac{\log_{10} G}{F \log_{10} g}$ and where
F is the sample period as a fraction of a year,
R is a prescribed desired percentage return on investment,
E is the last reported diluted headline earnings per share (HEPS),
C is a predetermined level of dividend cover at a predetermined level of growth under investigation,
G is an estimated growth rate in HEPS during the year following the last year of reporting, and
g is an estimated attenuation ratio of the growth rate of HEPS, measured by the growth rate in one year divided by the growth rate in the next.

* * * * *

UNITED STATES PATENT AND TRADEMARK OFFICE
CERTIFICATE OF CORRECTION

PATENT NO. : 7,523,056 B2
APPLICATION NO. : 11/102904
DATED : April 21, 2009
INVENTOR(S) : Herbert Charles Hiskett It is certified that error appears in the above-identified patent and that said Letters Patent is hereby corrected as shown below:

In the Claims

Column 13, Claim 1, line 45   Delete "ratio the"
                              Insert --ratio and the--

Column 14, Claim 4, line 3    Delete "for a"
                              Insert --for--

Column 16, Claim 15, line 36  Delete ":"
                              Insert --;--

Signed and Sealed this

Twenty-fourth Day of August, 2010

David J. Kappos
*Director of the United States Patent and Trademark Office*